(12) United States Patent
Kocher

(10) Patent No.: US 6,539,092 B1
(45) Date of Patent: Mar. 25, 2003

(54) LEAK-RESISTANT CRYPTOGRAPHIC INDEXED KEY UPDATE

(75) Inventor: Paul C. Kocher, San Francisco, CA (US)

(73) Assignee: Cryptography Research, Inc., San Francisco, CA (US)

(*) Notice: Subject to any disclaimer, the term of this patent is extended or adjusted under 35 U.S.C. 154(b) by 0 days.

(21) Appl. No.: 09/347,493

(22) Filed: Jul. 2, 1999

Related U.S. Application Data (60) Provisional application No. 60/091,644, filed on Jul. 2, 1998.

(51) Int. Cl.[7] ............................................. H04K 1/02
(52) U.S. Cl. ......................... 380/252; 380/1; 713/193; 713/194
(58) Field of Search .................. 380/252, 1; 713/193, 713/194

(56) References Cited

U.S. PATENT DOCUMENTS

| | | | | |
|---|---|---|---|---|
| 4,203,166 A | | 5/1980 | Ehrsam et al. ................. 375/2 |
| 4,214,126 A | * | 7/1980 | Wipff ..................... 179/1.5 M |
| 4,243,890 A | * | 1/1981 | Miller ........................ 250/551 |
| 4,908,038 A | * | 3/1990 | Matsumura et al. ........... 902/5 |
| 5,136,646 A | | 8/1992 | Haber et al. .................. 380/49 |
| 5,241,598 A | | 8/1993 | Raith .......................... 380/21 |
| 5,297,201 A | * | 3/1994 | Dunlavy ....................... 380/6 |
| 5,341,423 A | * | 8/1994 | Nossen ......................... 380/6 |
| 5,369,706 A | | 11/1994 | Latka .......................... 380/23 |
| 5,401,950 A | | 3/1995 | Yoshida ..................... 235/487 |
| 5,412,379 A | | 5/1995 | Waraksa et al. ........ 340/825.72 |
| 5,420,925 A | | 5/1995 | Michaels ..................... 380/23 |
| 5,544,086 A | | 8/1996 | Davis et al. ................ 364/408 |
| 5,552,776 A | * | 9/1996 | Wade ..................... 340/825.31 |
| 5,559,887 A | | 9/1996 | Davis et al. .................. 380/24 |

(List continued on next page.)

FOREIGN PATENT DOCUMENTS

EP 0 529 261 A2 3/1993 ............. H04L/9/08
EP 0 582 395 A2 2/1994 ........... H04L/29/06

OTHER PUBLICATIONS

Hachez et. al. Timing Attack:What Can Be Achieved By A Powerful Adversary? 1999.*

(List continued on next page.)

Primary Examiner—Gail Hayes
Assistant Examiner—James Seal
(74) Attorney, Agent, or Firm—Joseph Yang; Thomas R. Lane; Skadden, Arps (57) ABSTRACT

Methods and apparatuses for increasing the leak-resistance of cryptographic systems using an indexed key update technique are disclosed. In one embodiment, a cryptographic client device maintains a secret key value as part of its state. The client can update its secret value at any time, for example before each transaction, using an update process that makes partial information that might have previously leaked to attackers about the secret no longer usefully describe the new updated secret value. By repeatedly applying the update process, information leaking during cryptographic operations that is collected by attackers rapidly becomes obsolete. Thus, such a system can remain secure (and in some embodiments is provably secure) against attacks involving analysis of measurements of the device's power consumption, electromagnetic characteristics, or other information leaked during transactions. The present invention can be used in connection with a client and server using such a protocol. To perform a transaction with the client, the server obtains the client's current transaction counter. The server then performs a series of operations to determine the sequence of transformations needed to re-derive the correct session key from the client's initial secret value. These transformations are performed, and the result is used as a transaction session key. The present invention includes a sequence of client-side updating processes that allow for significant improvements in the performance of the corresponding server operations.

47 Claims, 4 Drawing Sheets

U.S. PATENT DOCUMENTS

| | | | | |
|---|---|---|---|---|
| 5,600,324 | A | | 2/1997 | Reed et al. ................. 341/176 |
| 5,633,930 | A | | 5/1997 | Davis et al. ................. 380/24 |
| 5,733,047 | A | | 3/1998 | Furuta et al. ................. 384/43 |
| 5,761,306 | A | | 6/1998 | Lewis ......................... 380/21 |
| 5,991,415 | A | * | 11/1999 | Shamir ........................ 380/30 |
| 5,995,629 | A | * | 11/1999 | Reiner ........................... 380/3 |

OTHER PUBLICATIONS

Paul Kocher, Timing Attacks on Implementation of Diffie–Hellman, RSA, DSS, and Other System, Crypto'96 pp. 104–113, Aug. 1996.*

Paul Kocher, Cryptanalysis of Diffie–Hellman, RSA, DSS, and Other Systems Using Timing Attacks Reprot 7 Dec. 1995.*

Burt Kaliski, Timing Attacks on Cryptosystem, RSA Laboratories,Bulletin, No. 2, Jan. 23, 1996.*

"Security Requirements for Cryptographic Modules," Federal Information Processing Standards Publication (FIPS PUB) 140–1, U.S. Department of Commerce, National Institute of Standards and Technology, Jan. 1994.

RSA Data Security, RSAREF Cryptographic Toolkit Source Code, File R–RANDOM.C, available fronftp://ftp.rsa.com.

Krawczyk, H. et al., "HMAC: Keyed–Hashing for Message Authentication," Network Working Group Request for Comments RFC 2104, Feb. 1997.

Ryan, J. "Blinds for Thermodynamic Cipher Attacks," unpublished material on the world wide web at http://www.cybertrace.com/thrmatak.html Mar. 1996.

American National Standard for Financial Services, Secretariat—American Bankers Association (ANS/ABA X9.24–1997), "Financial Services Key Management," approved Apr. 6, 1992, *American National Standards Institute*.

"Data Encryption Standard," Federal Information Processing Standards Publication (FIPS PUB) 46–2, U.S. Department of Commerce, National Institute of Standards and Technology, Dec. 30, 1993.

Biham, E. et al., "Differential Fault Analysis of Secret Key Cryptosystems" in: Kaliski, B., *Advances in Cryptology—CRYPTO 97*, (Berlin, Springer, 1997) $17^{th}$ Annual International Cryptology Conference, Aug. 17–21, 1997, pp. 513–525.

G. Hornauer et al., Eurocrypt 91, 1991, 453–460.

Koblitz, A Course in Number Theory and Cryptography 2e, 1994, Chapter III.

Lai et al., Eurocrypt 91, 1991, 17–38.

Brucer Schneier, Applied Cryptography, Second Edition "Protocols, Algorithm and Source Code in C"; p. 53.

Robert R. Jueneman, "Analysis of Certain Aspects of Output Feedback Mode", Satellite Business Systems, 1998; pp. 99–127.

Friedrich L. Bauer, "Cryptology—Methods and Maxims", Technical University Munich, 1998; pp. 31–48.

Doug Conner (Technical Editor), "Cryptographic Techniques—Secure Your Wireless Designs", Jan. 18, 1996; pp. 57–68.

* cited by examiner

LEAK-RESISTANT CRYPTOGRAPHIC INDEXED KEY UPDATE

This application claims the benefit of U.S. provisional patent application No. 60/091,644, filed on Jul. 2, 1998.

This application is related to co-pending U.S. patent application Ser. No. 09/224,682, filed on Dec. 31, 1998.

FIELD OF THE INVENTION

The present invention relates to systems for securely managing and using cryptographic keys, and more specifically to methods and apparatuses for securing cryptographic devices against external monitoring attacks.

BACKGROUND OF THE INVENTION

Attackers who gain access to cryptographic keys and other secrets can potentially perform unauthorized operations or forge transactions. Thus, in many systems, such as smartcard-based electronic payment schemes, secrets need to be protected in tamper-resistant hardware. However, recent work by Cryptography Research has shown that smartcards and other devices can be compromised if information about cryptographic secrets leaks to attackers who monitor devices' external characteristics such as power consumption or electromagnetic radiation.

In both symmetric and asymmetric cryptosystems, secret parameters must be kept confidential, since an attacker who compromises a key can decrypt communications, forge signatures, perform unauthorized transactions, impersonate users, or cause other problems. Methods for managing keys securely using physically secure, well-shielded rooms are known in the background art and are widely used today. However, previously-known methods for protecting keys in low-cost cryptographic devices are often inadequate for many applications, such as those with challenging engineering constraints (cost, size, performance, etc.) or that require a high degree of tamper resistance. Attacks such as reverse-engineering of ROM using microscopes, timing attack cryptanalysis (see, for example, P. Kocher, "Timing Attacks on Implementations of Diffie-Hellman, RSA, DSS, and Other Systems," *Advances in Cryptology—CRYPTO'96*, Springer-Verlag, pages 104–113), and error analysis (see, for example, E. Biham and A. Shamir, "Differential Fault Analysis of Secret Key Cryptosystems," *Advances in Cryptology—CRYPTO'97*, Springer-Verlag, 1997, pages 513–525) have been described for analyzing cryptosystems.

Key management techniques are known in the background art for preventing attackers who compromise devices from deriving past keys. For example, ANSI X9.24, "Financial services—retail management" defines a protocol known as Derived Unique Key Per Transaction (DUKPT) that prevents attackers from deriving past keys after completely compromising a device's state. Although such techniques can prevent attackers from deriving old keys, they have practical limitations and do not provide effective protection against external monitoring attacks in which attackers use partial information about current keys to compromise future ones.

Cryptography Research has also developed methods for using iterated hashing operations to enable a client and server to perform cryptographic operations while the client protects itself against external monitoring attacks. In such methods, the client repeatedly applies a cryptographic function to its internal secret between or during transactions, such that information leaked in each of a series of transactions cannot be combined to compromise the secret.

However, the system described has a disadvantage in that the server must perform a similar sequence of operations to re-derive the symmetric session key used in each transaction. Thus, in cases such as where there are a large number of unsynchronized server devices (such as electronic cash applications where a large number of merchant terminals operate as independent servers) or if servers have limited memory, the server cannot reliably precompute all possible session keys clients might use. As a result, transaction performance can suffer since a relatively large number of operations may be required for the server to obtain the correct session key. For example, the n-th client session key can require n server operations to derive. A fast, efficient method for obtaining leak-resistant and/or leak-proof symmetric key agreement would thus be advantageous.

SUMMARY OF THE INVENTION

The present invention describes ways to make smartcards (and other cryptographic client devices) secure even if attackers are able to use external monitoring (or other) attacks to gather information correlated to the client device's internal operations. In one embodiment, a cryptographic client device (e.g., a smartcard) maintains a secret key value as part of its state. The client can update its secret value at any time, for example before each transaction, using an update process that makes partial information that may have previously leaked to attackers about the secret no longer (or less) usefully describe the new updated secret value. (Information is considered useful if it can help or enable an attacker to implement an actual attack.) Thus, the secret key value is updated sufficiently frequently (perhaps as often as once per transaction) such that information leaked about the input state does not as usefully describe the updated state. By repeatedly applying the update process, information leaking during cryptographic operations that is collected by attackers rapidly becomes obsolete. Thus, such a system can remain secure against attacks involving repeated measurements of the device's power consumption or electromagnetic characteristics, even when the system is implemented using leaky hardware and software (i.e., that leak information about the secret values). (In contrast, traditional systems use the same secret value repeatedly, enabling attackers to statistically combine information collected from a large number of transactions.)

The present invention can be used in connection with a client and server using such a protocol. To perform a transaction with the client, the server obtains the client's current transaction counter (or another key index value). The server then performs a series of operations to determine the sequence of transformations needed to re-derive the correct session key from the client's initial secret value. These transformations are then performed, and the result is used as a transaction session key (or used to derive a session key).

The present invention can include a sequence of client-side updating processes that allow for significant improvements in the performance of the corresponding server operations, while maintaining leak-resistant and/or leak-proof security characteristics in the client device. In one embodiment of the invention, each process in the sequence is selected from among two forward cryptographic transformations ($F_A$ and $F_B$) and their inverses ($F_A^{-1}$ and $F_B^{-1}$). Using methods that will be described in detail below, such update functions are applied by the client in a sequence that assures that any single secret value is never used or derived more than a fixed number of times (for example, three). Furthermore, the update functions and sequence also assure that the state of (and hence the secret session key value used in) any transaction is efficiently derivable from a starting state (such as the state used in the first transaction) within a small number of applications of $F_A$ and $F_B$ (or their inverses).

If the number of operations that can securely be performed by a client is n (i.e., n different transactions can be performed, without using the same secret value more than a fixed number of times), a server knowing or capable of obtaining the client's initial secret value K (or initial state corresponding thereto) can derive any resulting secret value (or corresponding state) in the series of transactions significantly faster than by performing n corresponding updates. Indeed, the state for any given transaction can often be derived by a server using O(log n) calculations of $F_A$ and $F_B$ (or their inverses). If the system designer has made n sufficiently large, this can allow a virtually limitless set of transactions to be performed by clients while providing excellent server performance.

DETAILED DESCRIPTION OF THE INVENTION

Indexed Key Management

The invention enables parties to perform cryptographic operations with increased security against external monitoring attacks. Although exemplary embodiments are described involving two parties, a "client" and a "server", the terms "client" and "server" are chosen for convenience and might not necessarily correspond directly to any particular role in a system design. For example, the client could be a smartcard, and the server could be a mainframe computer, or vice versa. Furthermore, although most cryptographic operations involve two parties (e.g., one at the client and one at the server), the invention can, of course, be applied in environments involving only one party (such as in secure memory or storage systems in which both client and server are under a single party's control or are combined in a single device) or in environments involving more than two parties and/or devices.

In an exemplary embodiment, the client is initialized with a secret key $K_0$ for a symmetric cryptosystem, where $K_0$ is also known to (or derivable by) the server. The key $K_0$ is usually (but not necessarily) specific to a particular client device or party. The client also has a (typically non-secret) index or transaction counter C, which may be initialized to zero. An additional parameter is an index depth D. The value of D may also be non-secret, and (for example) may be client-specific or may be a system-wide global constant. The value of D determines the cycle length of the key update process.

Figure 1:
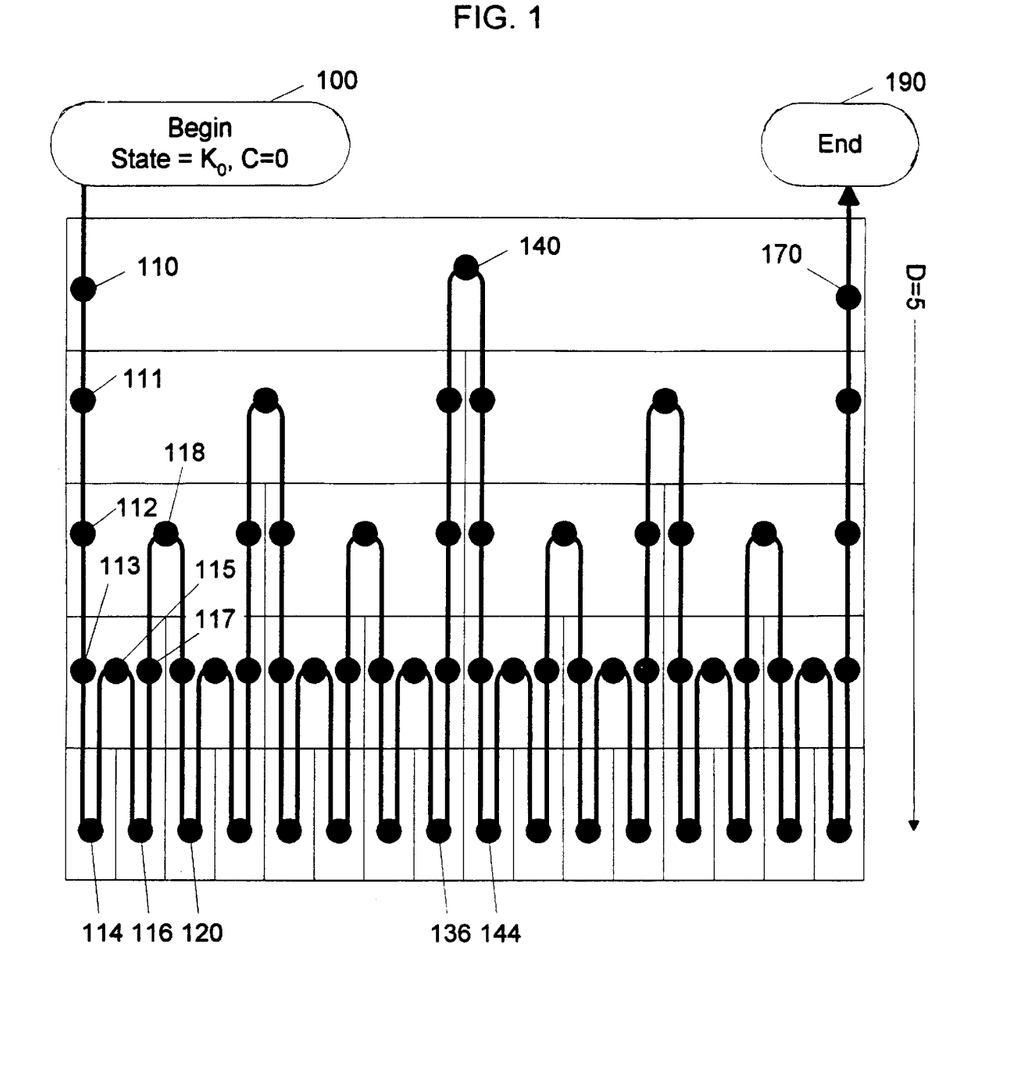
FIG. 1 shows an exemplary embodiment of a key update process through a series of transactions.

FIG. 1 shows an exemplary sequence of client device secret state values usable to perform a series of transactions, typically (but not necessarily) using one state per transaction. (The client process used to produce the sequence will be described with respect to FIG. 2 and the corresponding server process will be described with respect to FIG. 3.) A state's secret value typically, but not necessarily, includes a secret session key; therefore, as a matter of convenience, the secret value will be denoted by K and the term "secret value" may be used somewhat interchangeably with "key." Nevertheless, those skilled in the art will appreciate that they may be different in the general case. Also for clarity of exposition, the figure is drawn showing an exemplary key update process with D=5, meaning that five levels of key values are present. However, there is no specific limitation on D, and those skilled in the art will readily understand how the general principles underlying the exemplary embodiment can be used for other such cycle lengths. Indeed, commercially deployed systems would normally use larger values for D.

Each of the boxes in the figure represents a value of the secret value ($K_C$). Thus, multiple dots in a box represent different states sharing the same secret value $K_C$. The top row (row 0) of the figure contains one box, which corresponds to the initial state $K_0$ 110 as well as subsequent states $K_{30}$ 140 and $K_{60}$ 170, all of which share the same secret value $K_C$. The next row (row 1) contains two boxes, the left of which corresponds to a trio of states ($K_1$ 111, $K_{15}$, and $K_{29}$) sharing the same secret value, and the right box in the second row corresponds to a second trio of states ($K_{31}$, $K_{45}$, and $K_{59}$) sharing yet another secret value. Similarly, row 2 contains four boxes, representing a total of twelve states of which 4 trios each share among themselves the same secret value. More generally, in this exemplary embodiment, row N (where N<D−1) contains $2^N$ boxes (or unique secret values) and $3(2^N)$ states, and the last row (N=D−1) contains $2^N$ boxes and $2^N$ states. The thicker (curved) path diagrams the process by which the states are updated, starting from the initial state 110 and continuing through to the final state 170. As the states are updated, counter C is also updated (by one for each update).

The exemplary state update processes involve two functions ($F_A$ and $F_B$), and their inverses ($F_A^{-1}$ and $F_B^{-1}$), for a total of four functions. At step 100, the client is initialized or personalized with a starting counter C=0 and a starting state having a starting secret value $K_C=K_0$. At step 110, the device performs the first transaction, using $K_C$ (or a key derived from $K_C$). The key can be used in virtually any symmetric cryptographic transaction. (For example, such a transaction could involve, without limitation, computing or verifying a MAC (Message Authentication Code) on a message, encrypting or decrypting a message, producing a pseudo-random challenge value, deriving a key, etc. Examples of messages include, without limitation, data specifying the amounts of funds transfer operations, e-mail messages, challenge/response authentication data, parameter update authorizations, code updates, audio messages, digitized images, etc.)

After step 110, the client device's secret value $K_C$ is updated by applying the function $F_A$ and the counter C is incremented, i.e. by performing C←C+1 and $K_C$←$F_A(K_C)$. (Thus, at step 111, C=1 and $K_C=F_A(K_0)$.) The updated value of $K_C$ is used to perform a transaction at step 111. After step 111, C is incremented again and $F_A$ is again applied to $K_C$, i.e. by performing C←C+1 and $K_{C=2}$←$F_A(K_C)$, yielding the secret key used at step 112. The same pair of operations (C←C+1 and $K_C$←$F_A(K_C)$) are similarly applied between steps 112 and 113, and between steps 113 and 114.

The transaction at step 115 should use the same value of $K_C$ as did the transaction at step 113, since steps 113 and 115 are shown in the same box. Thus, after the transaction at step 114 the update process is performed by computing C←C+1 (yielding C=5) and $K_{C=5}$←$F_A^-(K_C)$. Note that $K_{C=5}=F_A^{-1}(K_{C=4})=F_A^{-1}(F_A(K_{C=3}))=K_{C=3}$. Thus, the value of $K_C$ used at step 115 is the same as the value used at step 113. After the transaction at step 115, $K_C$ is updated using function $K_B$ by incrementing C and computing $K_{C=6} \leftarrow F_B(K_C)$. After the transaction at step 116, the secret value for transaction 117 is computed by applying the function $F_B^{-1}$ to $K_C$.

The update process operates such that after each transaction, a key state update process is performed. The key update involves incrementing C and applying one of the functions $F_A$, $F_B$, $F_A^{-1}$, or $F_B^{-1}$ to the state $K_C$. The use of invertable functions allows a first state and a second state to share the same secret value, where the first state precedes entry into a child (lower level) box from a parent (upper level) box, and the second state is created by reentry into the parent box from the child box. Further, the multiplicity of functions (e.g., $F_A$ and $F_B$ in the exemplary embodiment) allows the creation of multiple child boxes from each parent box and, hence, a large number of allowable states before the sequence is exhausted (e.g., at end state 190). In going from one particular state to another particular state, the choice of functions (e.g., in the exemplary embodiment of FIG. 1, whether to use $F_A$, $F_B$, $F_A^{-1}$, or $F_B^{-1}$) depends on the current direction and location of the two particular states. In particular, referring again to the exemplary embodiment shown in FIG. 1, when moving downward from a parent box to the left-hand child, such as between steps 112 and 113, $F_A$ is applied by computing $K_C \leftarrow F_A(K_C)$. Further, when moving downward from a parent box to the right-hand child, such as between steps 115 and 116, $F_B$ is applied. Still further, when moving from a left-hand child to its parent, such as between steps 114 and 115, $F_A^{-1}$ is applied by computing $K_C \leftarrow F_A^{-1}(K_C)$. Finally, when moving from a right-hand child to its parent, such as between steps 116 and 117, $F_B^{-1}$ is applied. More generally, the choice of which function to apply in any particular state transition can be determined solely as a function of C, so the client need not maintain any information beyond its current state and its current counter value. This will be explained in greater detail in the section "Client Side Indexed Key Update," below, in the context of the exemplary embodiment of FIG. 1.

Eventually, the client may reach a point at which the entire table has been traversed. For example, the end of the process of FIG. 1 is reached at step 170, where C=60. After this transaction (or at an earlier point if the table length exceeds the maximum number of transactions allowed by the system), the client device could, and might typically, disable itself, such as by deleting its internal secrets. However, other actions may be preferable in some cases (e.g., by repeating back to step 110, entering a state in which rekeying is required, etc.). In the illustrated exemplary embodiment, the number of transactions that can be performed before the end of the process occurs is equal to $$2^{D-1} + \sum_{i=0}^{D-2} 3(2^i) = 2^{D-1} + 3(2^{D-1} - 1) = 2^{D+1} - 3.$$

(In the example with D=5, there can thus be $2^6-3=61$ transactions.) By choosing a sufficiently large value for D, a system designer can make the maximum number of transactions so large that the "end" will never be reached. For example, D =39 will allow more than 1 trillion ($10^{12}$) transactions without repeating.

Client-Side Indexed Key Update

Figure 2:
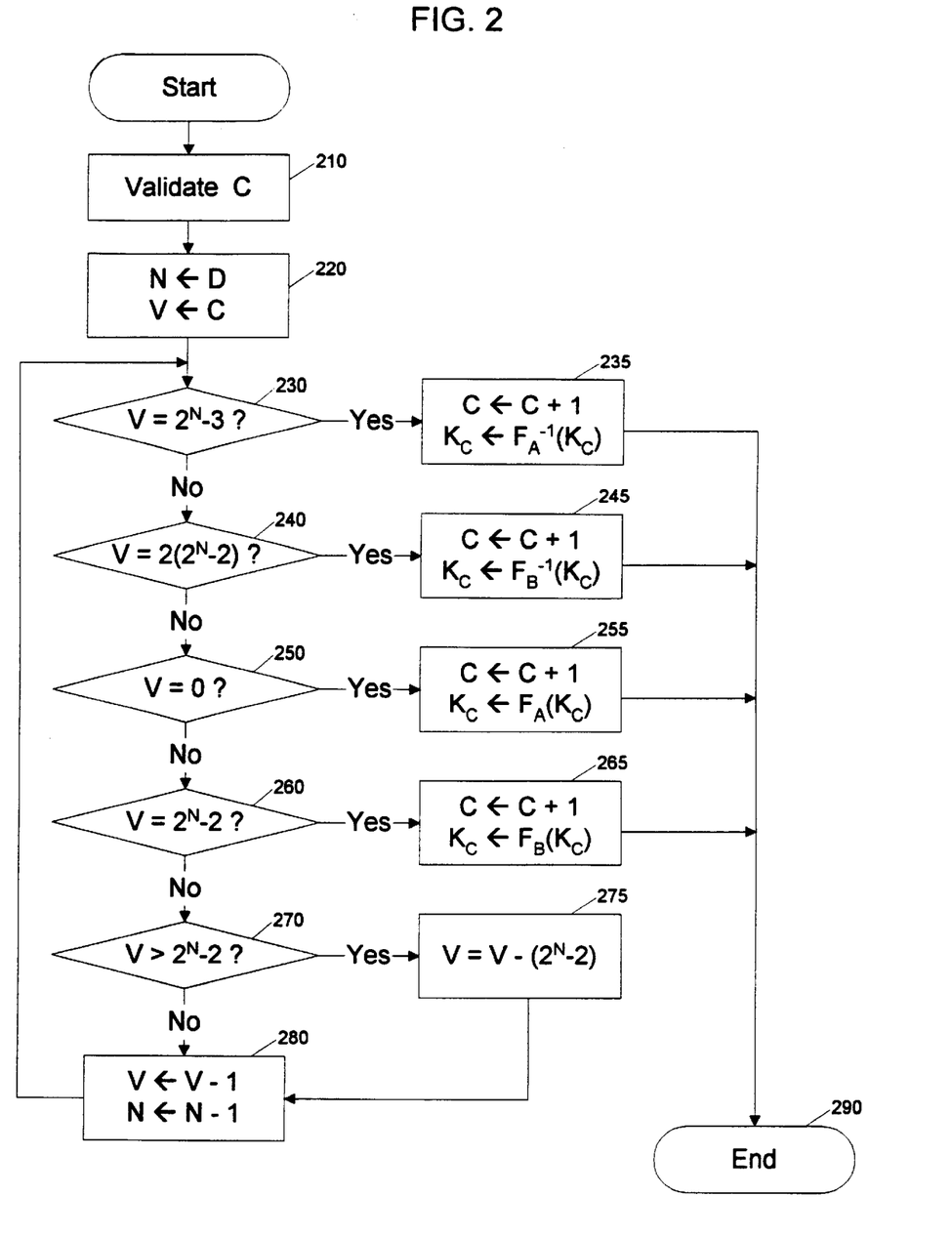
FIG. 2 shows an exemplary client-side indexed key update process.

For the exemplary embodiment of FIG. 1, the processes of incrementing C and choosing which function to apply ($F_A$, $F_B$, $F_A^{-1}$, or $F_B^{-1}$) can be performed by the client as shown in FIG. 2. At step 210, the client device verifies that C is valid, for example by confirming that C is non-negative and that C is less than $2^{D+1}-3$. (If C is invalid, then the transaction fails or other appropriate action is taken.) Since the client maintains C internally, step 210 can be omitted if the client is confident that C is valid. At step 220, the device initializes temporary depth and counter variables, N and V, with the values stored in D and C, respectively.

At step 230, the device tests whether the variable V is equal to the quantity $2^N-3$. If equal, function $F_A^{-1}$ should be applied, and processing proceeds to step 235 where the device increments C and updates $K_C$ by computing $K_C \leftarrow F_A^{-1}(K_C)$. Otherwise, at step 240, the device tests whether the variable V is equal to the quantity $2(2^N-2)$. If equal, function $F_B^{-1}$ should be applied, and processing proceeds to step 245 where the device increments C and updates $K_C$ by computing $K_C \leftarrow F_B^{-1}(K_C)$. Otherwise, at step 250, the device tests whether the variable V is equal to zero. If equal, function $F_A$ should be applied, and processing proceeds to step 255 where the device increments C and updates $K_C$ by computing $K_C \leftarrow F_A(K_C)$. Otherwise, at step 260, the device tests whether the variable V is equal to the quantity $2^N-2$. If equal, function $F_B$ should be applied, and processing proceeds to step 265 where the device increments C and updates $K_C$ by computing $K_C \leftarrow F_B(K_C)$.

At step 270, the device checks whether the value of V exceeds $2^N-2$. If not, processing proceeds directly to step 280. If V is larger than $2^N-2$, the value of V is diminished by $2^N-2$ and processing proceeds to step 280. At step 280, V and N are each decremented, then processing proceeds to step 230.

After performing a state update function at step 235, step 245, step 255, or step 265, the client process terminates successfully at step 290. After the successful conclusion of the process of FIG. 2, the secret value $K_C$ is used to perform a cryptographic transaction (or derive a key used to perform the transaction, for example by hashing or encrypting $K_C$, appending a salt or nonce, etc.).

Note that each iteration of the process of FIG. 2 corresponds to moving down one level in the drawing of FIG. 1, until the correct update operation is determined. Thus, the number of iterations of the loop cannot exceed D. Except for the key update functions (in the exemplary embodiment, $F_A$, $F_B$, $F_A^{-1}$, and $F_B^{-1}$), implementations of the function selection process need not be at all leak resistant; the function selection process of FIG. 2, its input value (i.e., C), and the choice of update functions need not be secret. Finally, as mentioned earlier and illustrated above in the case of the exemplary embodiment, the selection of which function to apply in any particular state transition can be characterized solely as a function of C, so the client need not maintain any information beyond its current state and its current counter value.

Server-Side Indexed Key Derivation

Figure 3:
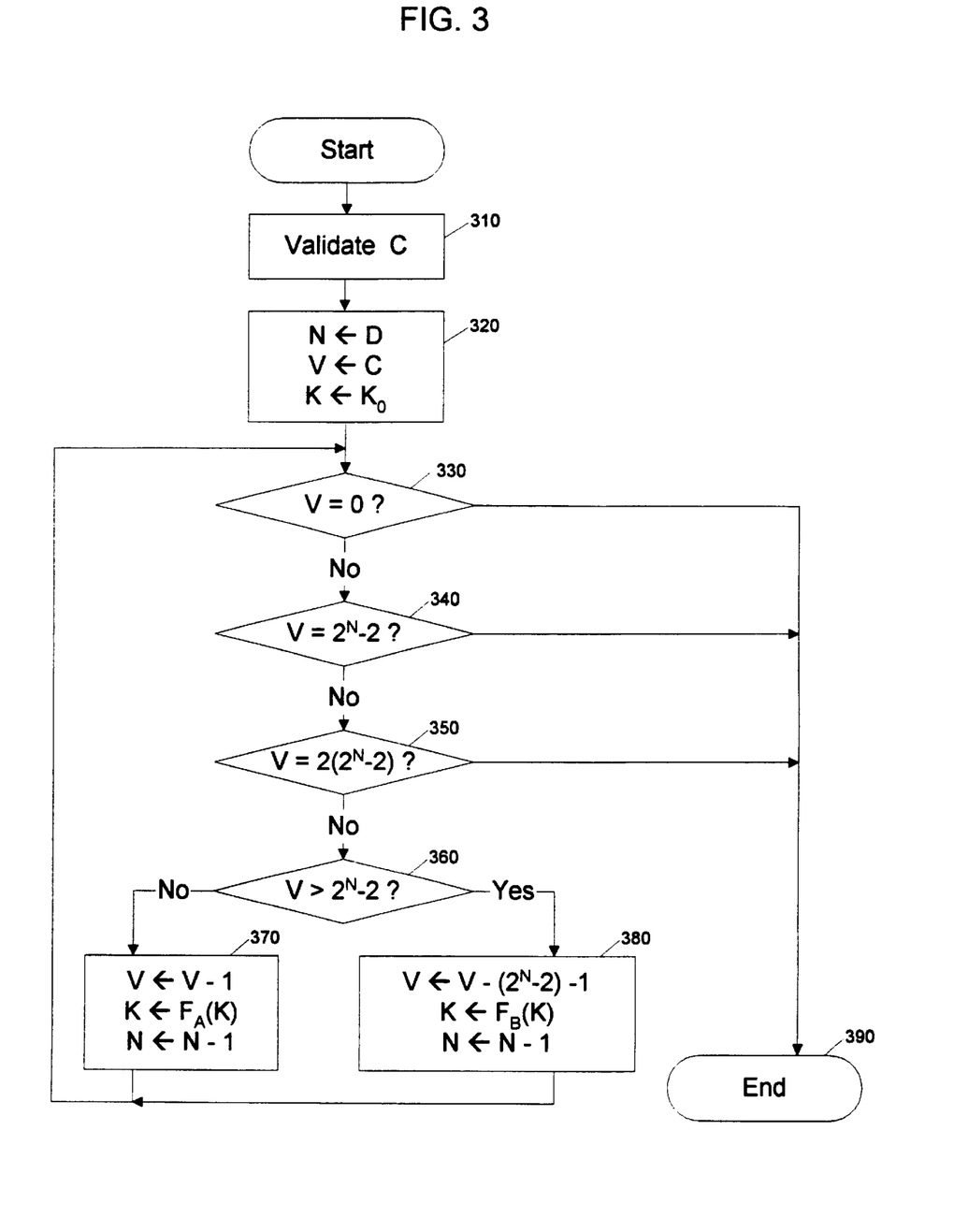
FIG. 3 shows an exemplary server process for deriving a transaction key from a key index and base key.

FIG. 3 shows an exemplary server-side process compatible with the exemplary client-side process of FIG. 2. Prior to commencing the process of FIG. 3, the server obtains the client's counter value C (typically by receiving C from the client device via a digital I/O interface), which is used as a key index. (In this exemplary embodiment, a transaction counter is used as a key index, but alternate embodiments can use a different value or representation of the key index.)

The server also obtains the client's base key value $K_0$ (for example, by retrieving $K_0$ from the server's memory, by cryptographically deriving $K_0$ using other secret keys or secret algorithms, by obtaining $K_0$ from a third party such as a key server, etc.). The server also knows or obtains D. At step 310, the server validates C to reject any possible invalid values of C. At step 320, the temporary variables N, V, and K are initialized with the values of D, C, and $K_0$, respectively. At step 330, the server checks whether the value of V is equal to zero. If so, the value of K equals the client's current secret ($K_C$), and the process concludes at step 390. Otherwise, processing continues to step 340 where the server tests whether V equals the value $2^N-2$. If so, the value of K equals the client's current secret ($K_C$), and the process concludes at step 390. Otherwise, processing continues to step 350 where the server tests whether V equals the value $2(2^N-2)$. If so, the value of K equals the client's current secret ($K_C$), and the process concludes at step 390. Otherwise, at step 360, the server checks whether V is larger than $2^N-2$. If not, processing continues at step 370 where V is decremented, K is updated by applying $F_A$ (i.e., K←$F_A$(K)), and N is decremented. If the test at step 360 reveals that V is larger than $2^N-2$, processing continues to step 380, where the value $2^N-1$ is subtracted from V, K is updated by applying $F_B$ (i.e., K←$F_B$(K)), and N is decremented. After either step 370 or step 380, processing continues at step 330. Processing continues until step 330, step 340, or step 350 indicates completion. When the process of FIG. 3 completes at step 390, the value contained in the variable K is equal to the value of $K_C$ at the client for counter value C. The client and server can thus use K=$K_C$ to secure a cryptographic transaction. If an error or error-causing attack occurs, K and $K_C$ will differ and the cryptographic transaction should fail.

State Transformation Operations

The above discussion involved the exemplary cryptographic operations $F_A$ and $F_B$, and their inverses $F_A^{-1}$ and $F_B^{-1}$, which will now be described in greater detail. A variety of such functions can be used, and the most appropriate form for these functions depends on the requirements and characteristics of the system.

Figure 4:
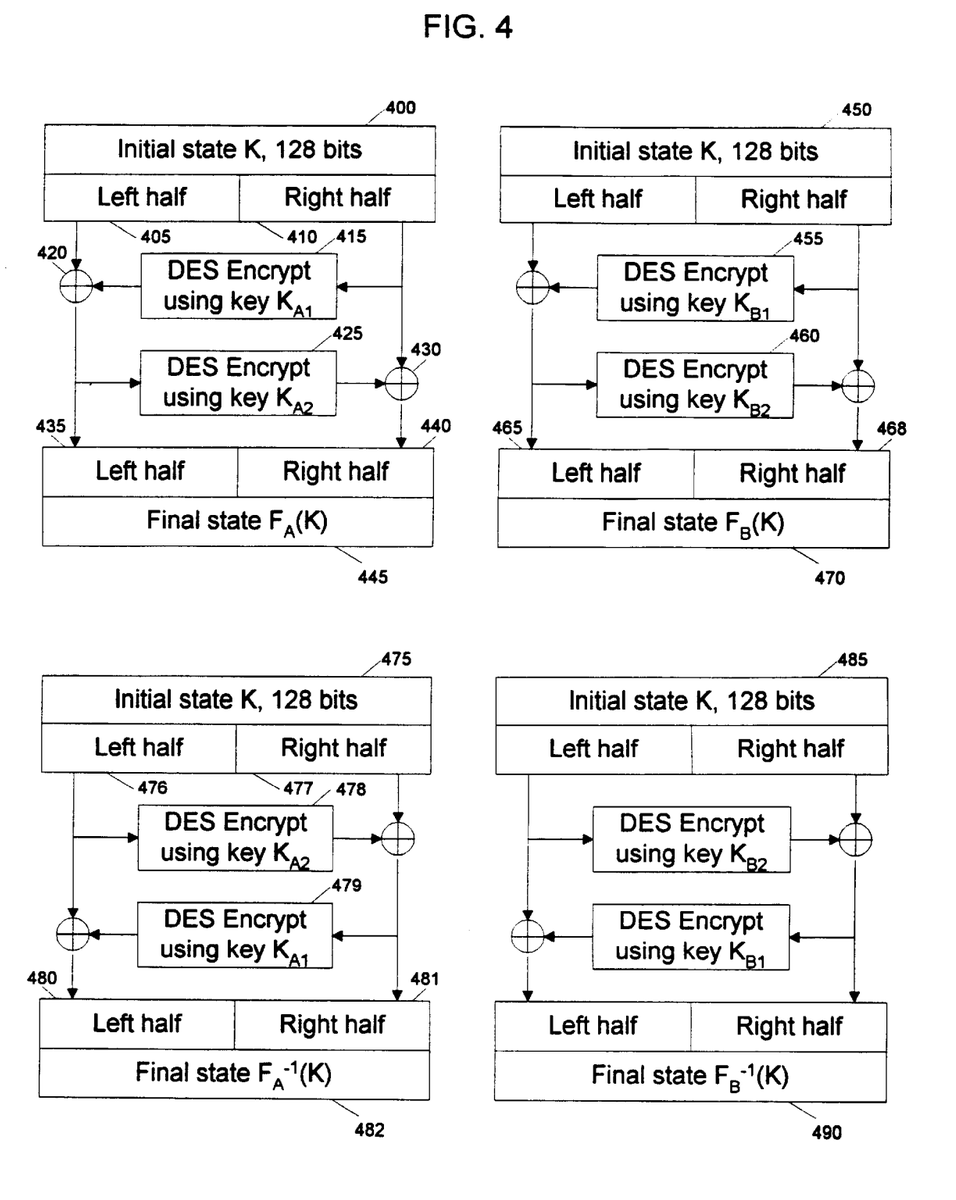
FIG. 4 shows exemplary embodiments of four state transformation operations.

In the exemplary functions shown in FIG. 4, the input and output of each function is 128-bits in size. For the function $F_A$, input state 400 is divided into a left half 405 and a right half 410, which are each 64 bits. The right half is provided as the input to a DES operation 415, which encrypts its input (right half 410) using a fixed key $K_{A1}$. The DES operation is only used as a nonlinear transformation that decreases or eliminates the usefulness of partial information an attacker might have about the input. Consequently, the key $K_{A1}$ does not need to be secret and can be a published constant. At operation 420, the result of the DES encryption is XORed onto the left half of the input. The result of the XOR becomes both the result left half 435 and the input to a second DES operation 425. The second DES operation uses key $K_{A2}$ to produce a result which, at operation 430, is XORed with the input right half 410. The XOR result becomes the result right half 440. The result left half 435 and result right half 440 are combined to produce the final result 445.

The structure of the function $F_B$ can be essentially identical, except that different keys are used. In particular, the first DES operation 455 encrypts the right half of input 450 using key $K_{B1}$, and DES operation 460 encrypts the XOR of the left half and the first DES result using key $K_{B2}$. As with $F_A$, the result left half 465 and right half 468 are combined to produce the final result 470.

The function $F_A^{-1}$ (the inverse of $F_A$) is computed using similar functions as $F_A$ but in the opposite order. The input 475 is divided into a left half 476 and right half 477. At DES operation 478, the left half 476 is encrypted using the DES key $K_{A2}$, and the result is XORed with the right half 477. The XOR result becomes the result right half 481 and is used as the input to DES operation 479 which encrypts using the key $K_{A1}$. The result of the second DES operation 479 is XORed with the input left half 476 to produce the result left half 480. Finally, the result left half 480 and right half 481 are combined to produce the final result 482. The function $F_B^{-1}$ is similar to $F_A^{-1}$ except that the input 485 is transformed into output 490 using keys $K_{B2}$ and $K_{B1}$ instead of $K_{A2}$ and $K_{A1}$.

The primary objective of the functions $F_A$, $F_B$, $F_A^{-1}$, and $F_B^{-1}$ is to destroy the usefulness of partial information about the input that might have been obtained by an attacker. For example, the DES operations used in the exemplary function $F_A$ shown in FIG. 4 make the function extremely nonlinear. An attacker with statistical information about the value of each of the 128 input bits (such as a guess of the bit's value that is correct with probability slightly greater than 0.5) will have statistical information about the input to the first DES operation 415. However, the DES output will be effectively randomized—even though attackers might know the DES key $K_{A1}$. The two DES operations in each update process "mix" the entire input state.

Thus partial statistical information about individual DES input bits does not provide useful statistical information about the DES output bits, provided that attackers never gain enough information to be able to guess the transformation operation entire input.

Other Embodiments

FIG. 4 shows just one exemplary set of functions for $F_A$ and $F_B$; many other variant or alternate designs can be used. For example, functions produced using additional rounds can be used (for example, a 3-round Luby-Rackoff block cipher). More generally, encryption and decryption using any block cipher can be used for the functions and their inverses. The basic functions used to construct the update function only need to prevent partial information leaked about the input from providing useful information about the output, so the functions do not necessarily need to be cryptographically hard to invert. For example, reduced-round variants of DES can be used. Further, although $F_A$ and $F_B$ in FIG. 4 have similar structure, this is not necessary. $F_A$ and $F_B$ can also be selected or modified depending on the state position (for example by using different functions or modified functions for each of the D levels).

Other types of functions can be used for $F_A$ and $F_B$. For example, if the input state is an odd value between 0 and $2^B$, $F_A$ and $F_B$ could be implemented using multiplication modulo $2^B$ with odd constants and the inverse functions could be implemented using multiplication with the constants' inverses also mod $2^B$. (Of course, other operations such as multiplication with prime moduluses can also be used.) The foregoing are provided as examples only; one of ordinary skill in the art will appreciate that a wide variety of other functions exist that can be used to implement functions $F_A$, $F_B$, $F_A^{-1}$, and $F_B^{-1}$.

For additional leak resistance, larger states can be used, for example a 256-bit state can be implemented by using four 64-bit blocks and using four (or more) DES operations to update the state, or by using two (or more) applications of a 128-bit hash function.

In alternate embodiments of the invention, other key update processes can be used. For example, by using more than two update functions (and their inverses), each parent state can have more than 2 child states. In fact, parents can have any number of child states, although as the number of child states increases, the number of cryptographic operations involving the parent state value, and the number of states sharing the same secret key, also increase; thus potentially increasing attackers' opportunity to attack the system.

The type of state updating process illustratively described with respect to FIG. 1 is advantageous because it uses very little memory and very little processing overhead, while the maximum number of transactions using the same secret value is small. (The more often such secret values are used, the greater the likelihood of successful external monitoring attack.) Therefore, in an alternate embodiment, transactions are performed using only the states at the lowest level of the diagram (which are produced only once), so that secret values are not reused. This reduces the opportunity for information to leak, but increases the processing overhead per transaction to an average of about four updates. (Also, the amount of time per transaction is not exact, since the number of update processes ranges from 2 to 2D−2. However, this is often not a problem, since few applications will ever need values of D larger than about 40 and many devices can perform thousands of cryptographic operations per second.)

In yet another an alternate embodiment, the client can cache a value at each vertical level or row. By caching higher-up values, it is not necessary to perform inverse operations, but slightly more memory is required. In such an embodiment, an average of two applications of $F_A$ or $F_B$ (which, in such an embodiment, do not need to have easy inverse functions) are required per operation if only bottom-level (single-use) states are used for transactions. A diagram of the state update processes for such an implementation would resemble a hash tree. For implementations requiring constant-time or more predictable performance, the additional processing time available during operations requiring only a single application of $F_A$ or $F_B$ can be used to precompute values that will be needed in the future, and thereby limit the execution time to two $F_A$ or $F_B$ operations per transaction.

In still other embodiments, the key index used by the server can be a value other than a transaction counter, since all the server requires is information sufficient to derive the current transaction key from the root key.

In some applications, C can be incremented periodically (e.g., if C is driven by a timer) or by some event other than transactions being performed. In such embodiments, if the client (or server) fails to correctly update C and derive the corresponding updated key, the transaction will fail. If the first value of C that is tried by the client (or server) fails, other likely session key values (such as those with close values of C) can be tried. (Of course, if the client and server versions of C diverge too far, the transaction will not proceed.) While the key index (e.g., C) is normally exchanged explicitly, in cases such as this the server might be able to guess or obtain C indirectly.

If both the client and server need to be secured against external monitoring attacks, the transaction can be performed using the larger of the two parties' transaction counters C. In particular, the client and server can exchange counter values, and (if the counters are not equal) each device can set its counter value to equal the larger of its value and the received value. The device with the lower value updates its secret to derive the appropriate transaction key. This update can be implemented by applying a combination of the usual update functions and their inverses. (For example, referring to the technique exemplified in FIG. 1, a client at state 117 could skip to state 136 by applying $F_A^{-1}$ twice then applying $F_B$ three times. In general, the total number of update functions required should be less than 2D−1. This "fast-forward" capability maintains the property that no state is used or derived more than a finite number of—here three—times.) In devices implementing this capability, care should be taken to assure that the system will not fail if a large, incorrect value of C is encountered. (For example, devices can reject excessively large jumps in C or can require additional cryptographic authentication, for example of the most significant bits of C.) Such a protocol can be used to agree on a transaction counter for embodiments involving more than two parties in cryptographic transactions.

Finally, the actual value used for the transaction key can be the value produced from the transformation function, or a value derived from the transformation result can be used. For example, the transformation result can be encrypted or hashed to produce the session key. A hashing step can help to limit the number of operations performed with any given key and thus help to limit the amount of information about the key that can leak to attackers. Alternatively or additionally, additional hashing operations can be performed periodically during the use of the session key, or fresh session keys can be required periodically.

To observe the largest possible number of transactions with a given secret key, an attacker might try to reset a target device before the device's memory can be updated with the new value of $K_C$ (e.g., during or immediately after the computation of $F_A$ or $F_B$). However, such a reset does not necessarily mean an attack is in progress, since resets can occur during the normal operation of many systems. (For example, power can be lost if a smartcard is removed during a transaction.) Therefore, in a preferred embodiment, a failure counter stored in nonvolatile memory is updated prior to each update process. Before the update begins, the counter is tested to determine whether the number of sequential failures exceeds a maximum value and, if not, the transaction proceeds normally. Once the new value of $K_C$ has been computed and safely written to memory and C has been incremented, the failure counter is reset. The probability that the counter threshold will be exceeded during normal operation of the device (i.e., when no attack is in progress) will be small, particularly if the update process is rapid.

The exemplary key update process described with regard to FIGS. 1, 2, and 3 assures that no secret key value is ever used in more than a relatively small number of (here, three) transactions. Attackers thus have the opportunity to collect information about the secret state during the three transactions themselves, the three key update processes that produce the transaction keys, and the three update processes that transform the transaction keys after the transactions. Implementers must make sure that the total amount of information about the secrets that leaks to attackers during these processes is not enough to compromise the secret state. When characterizing a design, it is often useful to determine or estimate the maximum amount of information that can leak from each transaction without compromising security.

Other Considerations

Cryptographic operations should normally be checked to ensure that incorrect computations do not compromise keys or enable other attacks. Cryptographic implementations of the present invention can be, and in a preferred embodiment of the invention are, combined with error-detection and/or error-correction logic to ensure that cryptographic operations are performed correctly. For example, a simple and effective technique is to perform cryptographic operations twice, ideally using two independent hardware processors and implementations, with a comparator to verify that both produce identical results. If the results produced by the two units do not match, the comparator will prevent either result from being used. In situations where security is more important than reliability, the comparator can make the device self-destruct if serious errors occur. For example, the comparator can cause a self-destruct if two defective DES operations occur sequentially or if five defective DES operations occur during the lifetime of the device. In some cryptosystems, redundancy is not necessary. For example, with RSA, self-checking functions can be incorporated into the cryptosystem implementation itself or verification can be performed after the operations.

Self-diagnostic functions such as a POST (power-on-self-test) should also be incorporated to verify that cryptographic functions have not been damaged. In some smartcards and other devices, the ATR (answer-to-reset) must be provided before a comprehensive self-test can be completed. In such cases, the self-test can be deferred until the first transaction or until a sufficient idle period. For example, a flag indicating successful POST completion can be set upon initialization. While the card is waiting for a command from the host system, it can attempt the POST. Any I/O received during the POST will cause an interrupt, which will cancel the POST (leaving the POST-completed flag at zero). If any cryptographic function is called, the device will check the POST flag and (if it is not set) perform the POST first.

Conclusions

The invention therefore encompasses a family of related techniques that enable the construction of devices that are significantly more resistant to attack than devices of similar cost and complexity that do not use the invention. In addition, multiple security techniques might be required to make a system secure; and leak resistance can be used in conjunction with other security methods or countermeasures.

As those skilled in the art will appreciate, the techniques described above are not limited to particular host environments or form factors. Rather, they can be used in a wide variety of applications, including without limitation: cryptographic smartcards of all kinds including without limitation smartcards substantially compliant with ISO 7816-1, ISO 7816-2, and ISO 7816-3 ("ISO 7816-compliant smartcards"); contactless and proximity-based smartcards and cryptographic tokens; stored value cards and systems; cryptographically secured credit and debit cards; customer loyalty cards and systems; cryptographically authenticated credit cards; cryptographic accelerators; gambling and wagering systems; secure cryptographic chips; tamper-resistant microprocessors; software programs (including without limitation programs for use on personal computers, servers, etc. and programs that can be loaded onto or embedded within cryptographic devices); key management devices; banking key management systems; secure web servers; electronic payment systems; micropayment systems and meters; prepaid telephone cards; cryptographic identification cards and other identity verification systems; systems for electronic funds transfer; automatic teller machines; point of sale terminals; certificate issuance systems; electronic badges; door entry systems; physical locks of all kinds using cryptographic keys; systems for decrypting television signals (including without limitation, broadcast television, satellite television, and cable television); systems for decrypting enciphered music and other audio content (including music distributed over computer networks); systems for protecting video signals of all kinds; intellectual property protection and copy protection systems (such as those used to prevent unauthorized copying or use of movies, audio content, computer programs, video games, images, text, databases, etc.); cellular telephone scrambling and authentication systems (including telephone authentication smartcards); secure telephones (including key storage devices for such telephones); cryptographic PCMCIA cards; portable cryptographic tokens; and cryptographic data auditing systems.

All of the foregoing illustrates exemplary embodiments and applications of the invention, from which related variations, enhancements and modifications will be apparent without departing from the spirit and scope of the invention. Therefore, the invention should not be limited to the foregoing disclosure, but rather construed by the claims appended hereto.

What is claimed is:

1. A computer-implemented process for securing a first device while performing transactions with at least one second device, wherein said first device includes a computer-readable memory having an internal secret state, and wherein said at least one second device has access to a base secret cryptographic value corresponding to said internal secret state, comprising the steps of:

(a) using an index parameter associated with said internal secret state to select at least one state transformation operation;

(b) applying at least said selected transformation operation to said internal secret state to produce an updated secret state:

(i) having associated therewith an updated secret cryptographic value derivable from said secret state, and (ii) in a manner inhibiting leaked partial statistical information about said internal secret state from usefully describing said updated secret state;

(c) replacing in said memory:

(i) said internal secret state with said updated secret state, and (ii) said index parameter with an updated index parameter;

(d) performing a cryptographic transaction with said at least one second device by transmitting said updated index parameter and at least one datum secured using said updated cryptographic value to said at least one second device configured to:

(i) regenerate said updated cryptographic value from said base cryptographic value, and (ii) use said updated cryptographic value to process said secured datum;

(e) said steps (a) through (d) being repeated a plurality of times, and said regeneration in (d)(i) being performable in substantially fewer applications of state transformations than a total number of repetitions of said steps (a) through (d).

2. The process of claim 1 wherein values for said updated secret cryptographic value are never recreated more than a fixed number of times when said step (b) is repeated a large number of times.

3. The process of claim 2 wherein said fixed number is three.

4. The process of claim 1 wherein it is provable that said step (b)(ii) prevents combining said partial information from multiple transactions to compromise said secret state.

5. The process of claim 1 further comprising a step of verifying that said selected transformation was computed correctly.

6. The process of claim 1 further comprising steps of incrementing a failure counter prior to said step (b), halting if said failure counter exceeds a maximum value, and resetting said failure counter after said step (b) has completed.

7. The process of claim 1 implemented in an ISO 7816-compliant smartcard.

8. The process of claim 7 where said smartcard is a stored value card.

9. The process of claim 1 where said transactions include secure payment for a purchase.

10. The process of claim 1 where said transactions include authorizing access to a service.

11. The process of claim 10 where said service includes access to web server.

12. The process of claim 11 implemented in an ISO 7816-compliant smartcard.

13. A cryptographic device comprising:
   (a) at least one memory containing a value of a secret parameter; and
   (b) a processor configured to perform a plurality of cryptographic transactions with a receiving cryptographic processing device, each said transaction involving a cryptographically processed datum, where:
      (i) each of said cryptographic transactions is performed using a key derived from said secret parameter,
      (ii) between said transactions, the usefulness of information related to said secret parameter that could have been previously gathered through external monitoring of said cryptographic device is reduced by updating the value of said secret parameter by performing a cryptographic key update operation; and
      (iii) after said update operation, the updated value of said secret parameter is stored in said at least one memory for use in at least one subsequent transaction; and
   (c) an interface configured to transmit said datum to said receiving device in which the updated value of said secret parameter after said processor has performed a plurality of update operations can be derived from the value of said secret parameter before said plurality of update operations.

14. The device of claim 13 wherein said cryptographic device is an ISO 7816-compliant smartcard.

15. The device of claim 13 wherein: (i) said plurality of update operations is performed n times; and (ii) the value of said updated secret parameter after said processor has performed said n update operations can be derived by said receiving device from the value of said secret parameter before said n operations with substantially less computational effort than would be required to perform n update operations.

16. The device of claim 15 wherein n is larger than 50.

17. The device of claim 15 wherein said key update operation has a cycle length x, and the effort required by said receiving device to derive said updated secret parameter from said secret parameter before said update operations requires computational effort of at most $O(\log x)$.

18. The device of claim 15 wherein said cryptographic device is an ISO 7816-compliant smartcard.

19. The device of claim 15 wherein said at least one memory further contains an index parameter, and where said processor is configured to increment the value of said index parameter each time the value of said secret parameter is updated.

20. The device of claim 19 wherein said processor is configured to update the value of said secret parameter by selecting at least one cryptographic transformation from a plurality of predefined cryptographic transformations, and applying said at least one cryptographic transformation to said secret parameter.

21. The device of claim 20 wherein said at least one memory further contains a depth parameter D and where said processor is configured to select said at least one cryptographic transformation based on the current value of said index parameter and said parameter D.

22. The device of claim 21 wherein said secret parameter includes D subelements, and said at least one cryptographic transformation modifies at least one of said subelements, and where the selection of said at least one subelement to modify depends on said index parameter.

23. The device of claim 20 wherein said plurality of predefined cryptographic transformations includes at least two transformations and the inverses of said two transformations.

24. The device of claim 23 wherein said plurality of cryptographic transformations includes a block cipher.

25. The device of claim 22 wherein said memory is initialized such that the initial value of said index parameter is zero, and said processor is configured to select a first cryptographic transformation when the current value of said index parameter is less than $D-1$.

26. The device of claim 25 wherein said processor is configured to select the inverse of said first cryptographic transformation when the current value of said index parameter is equal to $D-1$, and wherein said processor is configured to select a second cryptographic transformation when the current value of said index parameter is equal to D, and wherein said processor is configured to select the inverse of said second cryptographic transformation when the current value of said index parameter is equal to $D+1$.

27. The device of claim 19 wherein said processor includes overflow detection logic configured to verify that the current value of said index parameter is valid.

28. A cryptographic server device comprising:
   (a) an interface for receiving a value of an index parameter and cryptographic transaction data; and
   (b) a processor configured to derive a current value of a secret parameter from an initial value of said secret parameter, said value of said index parameter, and a value D representing the depth of a secret parameter transformation loop, within O(D) iterations of said secret parameter transformation loop and where the number of acceptable values for said index parameter is substantially larger than D.

29. The server device of claim 28 where said received cryptographic transaction data has been secured with a key derived from said current value of said secret parameter.

30. The device of claim 29 wherein said server comprises an ISO 7816-compliant smartcard.

31. The device of claim 29 wherein said server is a merchant terminal for a payment system.

32. The device of claim 28 wherein said processor is configured to derive said current value of said secret parameter by, for each said iteration of said secret parameter transformation loop, using a value derived from said index parameter to select at least one cryptographic transformation from a plurality of cryptographic transformations, and applying said at least one cryptographic transformation to said secret parameter.

33. A cryptographic system comprising a first device and a second device for performing transactions therebetween:
   (a) wherein said first device includes:
      (i) a memory for storing a value of a first secret parameter and a value of an index parameter; and
      (ii) a processor configured to perform a plurality of cryptographic transactions where:
         (a1) each of said transactions between said first device and said second device is secured using a transaction key derived from said first secret parameter, (a2) between transactions the usefulness of information related to said first secret parameter that could have been previously gathered through external monitoring of said first device is reduced by updating the value of said first secret parameter by performing a cryptographic key update operation;

(a3) the value of said updated first secret parameter after said processor has performed n of said key update operations can be derived from the value of said first secret parameter before said n operations with substantially less computational effort than would be required to perform said n operations; and (a4) said updated first parameter is stored in said memory for use in subsequent transactions; and (b) wherein said second device includes:

(i) a memory containing a second secret parameter;

(ii) an interface for receiving from said first device a representation of said index parameter and cryptographic transaction data, where said transaction data is secured using said transaction key;

(iii) a processor configured to use said received index parameter to select a sequence of predetermined cryptographic transformations and to use said sequence of transformations to derive said transaction key from at least said second secret parameter in an efficient manner such that, if said first device has transformed said first secret parameter n times, the number of transformations required for said second device to derive said transaction key is substantially less than n; and (iv) logic to process said transaction data using said transaction key.

34. The system of claim 33 wherein the number of transformations required by said second device is less than 40 for all values of n.

35. A method of performing a cryptographic transaction with a receiving party, using a secret parameter stored in a memory, comprising:

(a) performing a cryptographic transaction using a key derived from said secret parameter;

(b) applying a cryptographic key update operation to reduce the usefulness of information about the value of said secret parameter that could have been previously gathered through external monitoring attacks, such that after n update operations have been performed, said receiving party knowing the value of said secret parameter prior to said n update operations can derive the value of said updated secret parameter in substantially less than O(n) operations; and (c) replacing said secret parameter with said updated secret parameter in said memory.

36. The method of claim 35 wherein said steps (b) and (c) are performed at regular time intervals.

37. The method of claim 35 implemented in an ISO 7816-compliant smartcard.

38. The method of claim 35 implemented in a device that regulates access to an encrypted television signal.

39. The method of claim 35 implemented in a payment metering device.

40. A method of securing a cryptographic transaction between a first device and a second device using a secret parameter, comprising the steps of:

(a) initializing a memory contained in said first device with an initial value of said secret parameter;

(b) initializing a memory contained in said second device with a value usable to derive said initial value of said secret parameter;

(c) said first device securing a datum with a transaction key derived from said secret parameter;

(d) said first device transmitting transaction data including said secured datum and an index parameter to said second device;

(e) said first device applying a cryptographic key update operation to reduce the usefulness of information about the value of said secret parameter that could have been previously gathered through external monitoring attacks;

(f) said first device replacing said secret parameter in said memory with said updated secret parameter;

(g) said second device receiving said transaction data;

(h) said second device using at least said index parameter to derive said transaction key from said value stored in the memory of said second device, where said deriving requires substantially less than n transformation operations, where n represents the total number of times that said step (e) has been applied by said first device to update said secret parameter; and (i) using said transaction key derived in said step (h) to process said secured datum.

41. The method of claim 40 wherein the maximum number of said transformation operations performed at said step (h) is O(log x), where x is the maximum number of transactions that could be observed by an attacker of said first device.

42. The method of claim 40 where said first device is an ISO 7816-compliant smartcard.

43. The method of claim 40 wherein said first device and said second device are components of a larger device.

44. The method of claim 40 wherein said second device also contains an index parameter, and comprising the further steps of:

(a) selecting the larger index parameter of the two devices, (b) using said larger index value to secure said transaction, and (c) both of said devices incrementing and storing said larger index value for use in subsequent transactions.

45. The method of claim 40 wherein steps (a) through (i) are performed in a different order.

46. The method of claim 40 wherein said cryptographic transformation includes:

(a) dividing the value of said secret parameter into at least two subvalues;

(b) encrypting a first of said subvalues to generate an encrypted subvalue;

(c) using an exclusive OR operation to combine said encrypted subvalue with a second of said subvalues to form a first portion of the result of said transformation;

(d) encrypting said result first portion; and (e) exclusive ORing said encryption of said first result portion with said first subvalue to produce a second portion of the result of said transformation.

47. The method of claim 46 wherein said steps of encrypting involve the DES algorithm.

* * * * *